United States Patent
Kupcsik et al.

(10) Patent No.: US 12,350,847 B2
(45) Date of Patent: Jul. 8, 2025

(54) METHOD FOR CONTROLLING A ROBOT FOR MANIPULATING, IN PARTICULAR PICKING UP, AN OBJECT

(71) Applicant: Robert Bosch GmbH, Stuttgart (DE)

(72) Inventors: Andras Gabor Kupcsik, Herrenberg (DE); Christian Graf, Munich (DE); Miroslav Gabriel, Munich (DE); Philipp Christian Schillinger, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 231 days.

(21) Appl. No.: 18/334,959

(22) Filed: Jun. 14, 2023

(65) Prior Publication Data
US 2023/0415349 A1   Dec. 28, 2023

(30) Foreign Application Priority Data
Jun. 22, 2022   (DE) ...................... 10 2022 206 274.4

(51) Int. Cl.
| | |
|---|---|
| *B25J 9/16* | (2006.01) |
| *G06T 7/00* | (2017.01) |
| *G06T 11/00* | (2006.01) |

(52) U.S. Cl.
CPC ........... *B25J 9/1697* (2013.01); *G06T 7/0004* (2013.01); *G06T 11/00* (2013.01);
(Continued)

(58) Field of Classification Search
CPC ...... B25J 9/1697; B25J 9/1612; B25J 9/1679; B25J 15/08; B25J 9/161; B25J 9/1653;
(Continued)

(56) References Cited

U.S. PATENT DOCUMENTS

| | | | |
|---|---|---|---|
| 9,669,543 B1* | 6/2017 | Stubbs | B25J 9/1612 |
| 2011/0010009 A1* | 1/2011 | Saito | B25J 9/1612 |
| | | | 703/13 |

(Continued)

FOREIGN PATENT DOCUMENTS

| | | |
|---|---|---|
| DE | 102013113459 A1 | 10/2014 |
| DE | 102014223167 A1 | 5/2016 |

(Continued)

*Primary Examiner* — Ryan Rink
(74) *Attorney, Agent, or Firm* — NORTON ROSE FULBRIGHT US LLP

(57) ABSTRACT

A method for controlling a robot for manipulating, in particular picking up, an object. The method includes: creating an image which depicts the object; generating a manipulation-quality image from the image, in which, for each pixel which represents a point on the surface of the object, the pixel value of the pixel provides an assessment of how well the object may be manipulated at the point; recording descriptors of points of the object which should be used during the manipulation and/or of points which should be avoided during the manipulation; mapping the image onto a descriptor image; generating a manipulation-preference image by comparing the recorded descriptors of points to the descriptor image; selecting a point for manipulating the object taking into account the pixel values of the manipulation-quality image and the pixel values of the manipulation-preference image; and controlling the robot to manipulate the object at the selected point.

8 Claims, 3 Drawing Sheets

(52) U.S. Cl.
CPC ............... *G06T 2207/20081* (2013.01); *G06T 2207/20084* (2013.01); *G06T 2207/20212* (2013.01)

(58) Field of Classification Search
CPC ....... B25J 9/1664; B25J 13/08; G06T 7/0004; G06T 11/00; G06T 2207/20081; G06T 2207/20084; G06T 2207/20212; G06T 2207/20104; G06T 2207/30164; G06T 7/11; G06T 7/74; G06T 7/30; G05B 2219/39536; G05B 2219/40564; G05B 2219/40584
See application file for complete search history.

(56) References Cited

U.S. PATENT DOCUMENTS

| | | | |
|---|---|---|---|
| 2014/0277742 A1* | 9/2014 | Wells | B25J 9/1612 700/264 |
| 2016/0136807 A1* | 5/2016 | Scheurer | B25J 9/1612 700/250 |
| 2021/0283782 A1* | 9/2021 | Miao | G06T 7/0004 |
| 2022/0016766 A1* | 1/2022 | Humayun | G06T 7/73 |
| 2022/0152834 A1* | 5/2022 | Kupcsik | B25J 9/1697 |
| 2022/0245849 A1* | 8/2022 | Safronov | G06V 10/774 |
| 2022/0379484 A1* | 12/2022 | Tremblay | B25J 13/08 |
| 2022/0388162 A1* | 12/2022 | Fan | G06N 3/09 |
| 2022/0398740 A1* | 12/2022 | Lenga | G06V 10/82 |

FOREIGN PATENT DOCUMENTS

| | | |
|---|---|---|
| DE | 102017108727 A1 | 10/2018 |
| DE | 102019206444 A1 | 11/2020 |
| DE | 112019001507 T5 | 12/2020 |
| DE | 102021103726 A1 | 9/2021 |
| DE | 102020214301 A1 | 5/2022 |
| DE | 102021202570 A1 | 9/2022 |
| EP | 2263837 A1 | 12/2010 |
| EP | 3702108 A1 | 9/2020 |

* cited by examiner

METHOD FOR CONTROLLING A ROBOT FOR MANIPULATING, IN PARTICULAR PICKING UP, AN OBJECT

CROSS REFERENCE

The present application claims the benefit under 35 U.S.C. § 119 of German Patent Application No. DE 10 2022 206 274.4 filed on Jun. 22, 2022, which is expressly incorporated herein by reference in its entirety.

FIELD

The present invention relates to a method for controlling a robot for manipulating, in particular picking up, an object.

BACKGROUND INFORMATION

When picking up objects using a robot, there are multiple approaches to detecting the most promising object points for gripping, e.g., for removing an object from a container. These approaches typically operate using RGB-D images (i.e., images with color information and depth information) of the scene, with either RGB or depth images being sufficient in some cases. Moreover, the majority of these approaches are based on AI methods, such as the use of neural nets to learn an association between input data and promising gripping points. It is therefore vitally important that these AI methods are able to detect reliably grippable regions on the surfaces of objects. In this connection, however, a major challenge for AI methods consists in the AI learning how an object may be gripped, if this needs to take place in a certain way or if certain regions which may be easily damaged need to be avoided. Whilst this task often seems trivial to a human, it is difficult for general criteria which may be taken into account by a machine learning model to be specified in advance.

Approaches are therefore desirable which enable an object to be picked up automatically by a robot, the robot taking into account which points of the object should be avoided or preferred when picking it up.

SUMMARY

According to various specific embodiments of the present invention, a method for controlling a robot for manipulating, in particular picking up, an object is provided, comprising creating an image which depicts the object, generating a manipulation-quality image from the image, in which, for each pixel which represents a point on the surface of the object, the pixel value of the pixel provides an assessment of how well the object may be manipulated at the point, recording descriptors of points of the object which, according to a user input, should be used during the manipulation and/or points which, according to a user input, should be avoided during the manipulation, mapping the image onto a descriptor image, generating a manipulation-preference image by comparing the recorded descriptors of points to the descriptor image, in which manipulation-preference image, for each pixel which represents a point on the surface of the object, the pixel value of the pixel provides an assessment of whether the object should be manipulated at the point, selecting a point for manipulating the object taking into account the pixel values of the manipulation-quality image and the pixel values of the manipulation-preference image and controlling the robot to manipulate the object at the selected point.

The method described above enables the manipulation to take place at points which not only may be easily manipulated (in terms of their geometric or physical properties, e.g. no edges, not too rough) but also should be manipulated (according to a user input and therefore user preference), and enables the manipulation to be avoided at points which should be avoided from the point of view of a user.

Manipulating may mean, in particular, picking up (e.g., gripping or even applying suction in the case of a vacuum gripper). The challenges, described below, when picking up an object may likewise be presented in other activities, such as turning a key, pressing a button or pulling a lever, and the measures for picking up the object according to various specific embodiments may likewise be successfully applied to these other activities.

The detection of points for manipulation takes place here pixel-wise (e.g., for pixels of an input image, although changes in resolution may be made when generating the manipulation-quality image and manipulation-preference image, e.g., these two images may have a lower resolution).

Various specific embodiments are indicated below.

Exemplary embodiment 1 is a method for controlling a robot for manipulating, in particular picking up, an object, as described above.

Exemplary embodiment 2 is a method according to exemplary embodiment 1, the manipulation-quality image being mapped by a first neural network, which is trained to map images of objects and/or information derived from images of objects onto manipulation-quality images, and/or the image being mapped to the descriptor image by a second neural network, which is trained to map images of objects onto descriptor images.

The use of neural networks enables efficient execution of the respective tasks for generating the manipulation-quality image and the manipulation-preference image. To this end, the (input) image may contain color information (or even gray-scale values) and/or depth information.

Exemplary embodiment 3 is a method according to exemplary embodiment 1 or 2, comprising combining the manipulation-quality image and the manipulation-preference image and selecting the point for manipulating the object using the combination.

A combined image is therefore generated (e.g. through pixel-wise combination), which, by searching a point in the combined image (e.g. after coding the manipulation qualities or preferences or a combination thereof), enables a suitable point for manipulating, in particular picking up the object (gripping or applying suction), by searching for a maximum pixel value or minimum pixel value.

Exemplary embodiment 4 is a method according to one of the exemplary embodiments 1 to 3, the assessment for whether the object should be manipulated at the point being the degree of correlation between the descriptor which is assigned to the point in the descriptor image and one of the recorded descriptors. Since a pixel in the (input) image is assigned to each point of the object and mapped to the descriptor image, a pixel in the descriptor image, and therefore also a descriptor (which is the pixel value of this pixel), is accordingly assigned to each point of the object. Analogously, points of the object are represented by pixels in the various images used and generated here and (pixel) values are assigned to the points.

Therefore, an uncertainty as to whether a point should be avoided or should be used is also expressed in the assessment. This uncertainty may be taken into account by taking into account the pixel values of the manipulation-quality value accordingly when selecting the point for manipulation.

Exemplary embodiment 5 is a method according to one of the exemplary embodiments 1 to 4, comprising generating the manipulation-quality image by forming a descriptor-correlation image for each recorded descriptor, in which, for each pixel which represents a point on the surface of the object, the pixel value of the pixel indicates how well the descriptor which is assigned to the point in the descriptor image correlates with the recorded descriptor, and combining the descriptor-correlation images to form the manipulation-quality image.

By way of example, the descriptor-correlation images (e.g. heat maps), may be combined by taking the pixel-wise maximum over the descriptor-correlation images (or minimum depending on the coding of the correlation in the pixel values). This enables efficient generation of the manipulation-quality image.

Exemplary embodiment 6 is a method according to exemplary embodiment 5, comprising combining the manipulation-quality image and the manipulation-preference image through pixel-wise multiplication, calculating the pixel-wise maximum, calculating the pixel-wise minimum, excluding points for which the manipulation-quality image indicates a manipulation quality below a predetermined minimum quality, excluding points for which the manipulation-preference image indicates a correlation with a descriptor below a minimum correlation for a point which, according to the user input, should be used during the manipulation, and/or excluding points for which the manipulation-preference image indicates a correlation with a descriptor above a predetermined maximum correlation, recorded for a point which, according to the user input, should be avoided during the manipulation.

It is thus possible to efficiently generate a combined image, which indicates points at which the object both may and should be manipulated.

Exemplary embodiment 7 is a robot control device, which is designed to carry out a method according to one of the exemplary embodiments 1 to 6.

Exemplary embodiment 8 is a computer program having commands which, when executed by a processor, prompt the processor to carry out a method according to one of the exemplary embodiments 1 to 6.

Exemplary embodiment 9 is a computer-readable medium, which stores commands which, when executed by a processor, prompt the processor to carry out a method according to one of the exemplary embodiments 1 to 6.

In the figures, all similar reference signs generally relate to the same parts in all of the various views. The figures are not necessarily to scale, the emphasis instead generally being placed on illustrating the principles of the present invention.

In the description below, various aspects are described with reference to the figures.

DETAILED DESCRIPTION OF EXAMPLE EMBODIMENTS

The detailed description below relates to the figures, which, for explanatory purposes, depict specific details and aspects of this disclosure via which the present invention may be explained. Other aspects may be applied, and structural, logical and electrical modifications may be carried out without deviating from the scope of the present invention. The various aspects of this disclosure are not necessarily mutually exclusive, since some aspects of this disclosure may be combined with one or more other aspects of this disclosure to create new aspects.

Various examples are described in more detail below.

Figure 1:
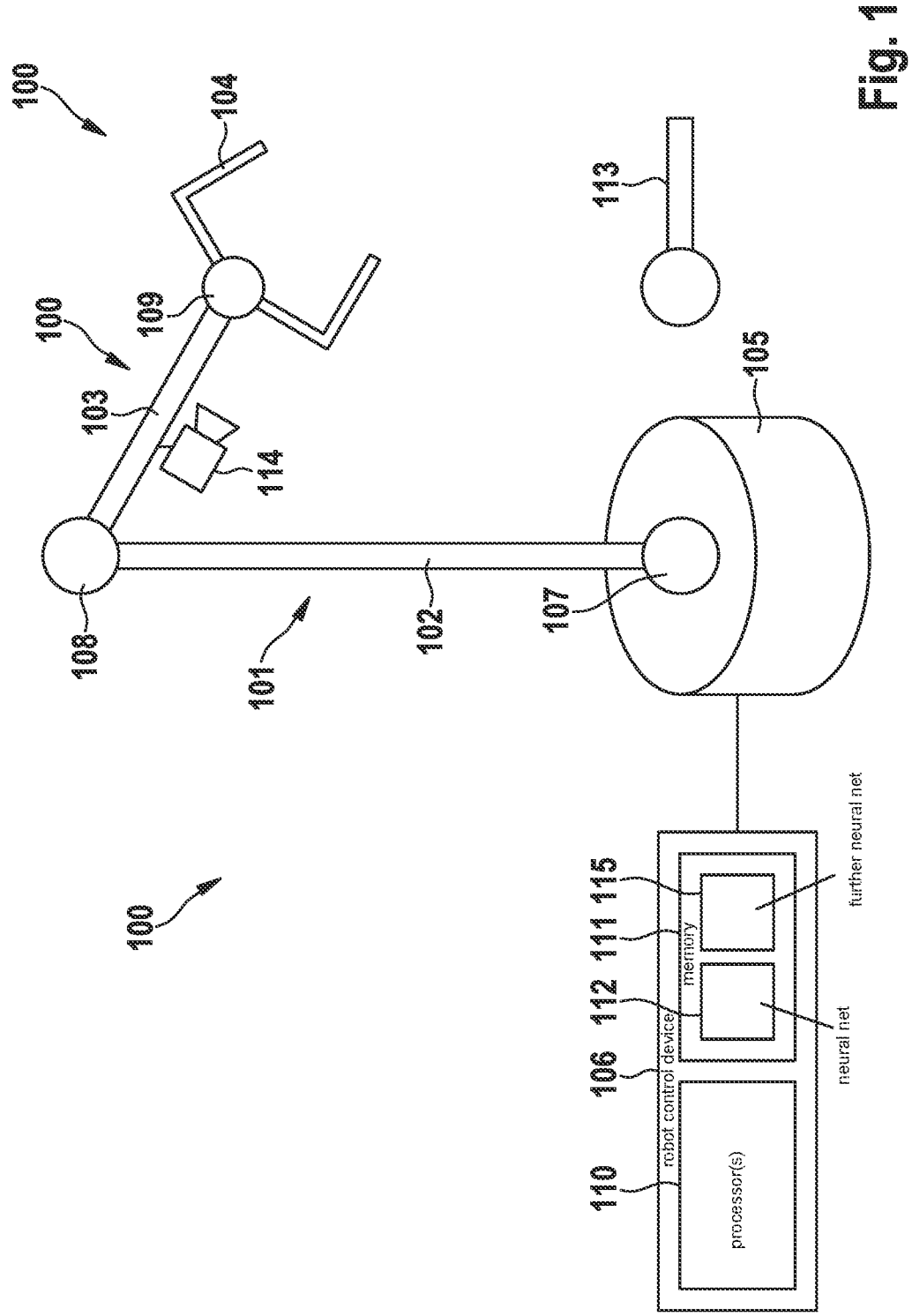
FIG. 1 depicts a robot, according to an example embodiment of the present invention.

FIG. 1 depicts a robot 100.

The robot 100 comprises a robot arm 101, for example an industrial robot arm for handling or assembling a workpiece (or one or more other objects). The robot arm 101 comprises manipulators 102, 103, 104 and a base (or support) 105, by which the manipulators 102, 103, 104 may be supported. The expression "manipulator" relates to the movable components of the robot arm 101, the actuation of which enables a physical interaction with the environment, e.g. to execute a task. For control purposes, the robot 100 comprises a (robot) control device 106, which is configured to implement the interaction with the environment according to a control program. The last component 104 of the manipulators 102, 103, 104 (which is furthest away from the support 105) is also referred to as an end effector 104 and may comprise one or more tools, for instance a welding torch, a gripping instrument, a painting device or the like.

The other manipulators 102, 103 (which are located nearer to the support 105) may form a positioning apparatus such that, when combined with the end effector 104, the robot arm 101 is provided with the end effector 104 at its end. The robot arm 101 is a mechanical arm, which may provide similar functions to a human arm (possibly with a tool at its end).

The robot arm 10 may comprise joint elements 107, 108, 109, which connect the manipulators 102, 103, 104 to each other and to the support 105. A joint element 107, 108, 109 may have one or more joints, which may each provide a rotating movement (i.e. rotation) and/or translatory movement (i.e. displacement) of associated manipulators relative to each other. The movement of the manipulators 102, 103, 104 may be initiated by actuators, which are controlled by the control device 106.

The expression "actuator" may be understood as a component which is designed to activate a mechanism or process in response to its drive. The actuator may implement instructions (the so-called activation) generated by the control device 106 as mechanical movements. The actuator, e.g., an electromechanical converter, may be designed to convert electrical energy into mechanical energy in response to its activation.

The expression "control" may be understood as any type of logic-implementing entity, which may comprise, for example, a circuit and/or a processor which is capable of executing software stored in a storage medium, firmware or a combination thereof, and which may issue instructions, e.g. to an actuator in the present example. The control may be configured, for example, using program code (e.g., software) in order to control the operation of a system—in the present example, a robot.

In the present example, the control device 106 comprises one or more processors 110 and a memory 111, which stores code and data, on the basis of which the processor 110 controls the robot arm 101. According to various specific embodiments, the control device 106 controls the robot arm 101 on the basis of a machine learning model 112, which is stored in the memory 111.

According to various specific embodiments, the machine learning model 112 is configured and trained to enable the robot 100 to detect a point of an object 113 at which the robot 100 may pick up the object 113 (or interact with it in another way, e.g., paint it).

The robot 100 may be equipped, for example, with one or more cameras 114, which enable it to capture images of its working space. The camera 114 is fastened, for example, to the robot arm 101, so that the robot may create images of the object 113 from various perspectives by moving its robot arm 101 around.

According to various specific embodiments, the machine learning model 112 is a neural net 112 and the control device 106 transfers input data to the neural net 112 based on the one or more digital images (color images, depth images or both) of an object 113 and the neural net 112 is designed to indicate points (or regions) of the object 113 which are suitable for picking up the object 113. By way of example, the neural net may segment an input image, which depicts the object 113, accordingly, e.g. assign a value ("manipulation-quality value" or, in the present case, a "pick-up-quality value") to each pixel, which indicates how suitable the pixel is in terms of picking up the object. The control device 106 may then select a sufficiently large region in which these values are sufficiently high (e.g., are above a threshold value, are maximal on average, etc.) as a point for picking up the object.

According to various specific embodiments, the raw image data, which are provided by the camera, are pre-processed by the control device 106 instead of being fed directly to the neural net 112 as an input. The result of this pre-processing is used as an input for the neural net 112 (with at least some of the raw image data, if necessary).

A possible example of this is the standard deviation (or another measure of the distribution, such as the variance) of normal vectors of the surface of objects depicted in the digital images during pre-processing. The normal vector standard deviation is suitable for representing the local flatness of a surface and therefore constitutes particularly relevant information for the gripping quality (or for the quality of an object region for applying suction).

For example, one or more cameras, for example corresponding to the camera 114, provide raw image data (i.e. one or more images), which contain, in particular, depth information about an object. From this depth information, normal vectors of the surface of the object and the standard deviations thereof (in various regions of the surface) are ascertained in a pre-processing procedure. This is fed to the neural net 112 as an input. The input for the neural net 112 may also contain some (or all) of the raw image data or image data generated therefrom according to prior image-enhancing pre-processing (e.g. noise reduction). Such prior image-enhancing pre-processing may also be used to generate image data which is then used as the basis for determining the standard deviation. The neural net is trained (e.g., via corresponding training inputs (incl. normal vector standard deviations) and associated target outputs, i.e. ground-truth information for supervised learning), to map the input to an output, which identifies points or regions of the object which are (e.g., particularly) suitable for picking up the object.

Various architectures may be used for the neural net 112. The neural net 112 may have just one input channel for the standard deviations of the normal vectors or a multi-channel input which contains the standard deviation of the normal vectors as data of a channel in addition to others (e.g., color image data and/or depth image data). Examples are fully convolutional networks, e.g., UNet, ResNet, which assign a value (which indicates the suitability of the respective point for picking up the depicted object) to an input image in order to generate an output image of the same size as the input image.

Using the above approach, for example when the normal vectors described above are taken into account, a manipulation-quality image may be generated from an input image captured by a camera 114, in which manipulation-quality image, for each pixel, the pixel value (which is in the range [0, 1], for example) indicates how well an object may be picked up at a point which corresponds to the pixel (i.e., which is represented in the input image by a pixel for which the position in the input image corresponds to the position of the pixel in the manipulation-quality image).

However, selecting a point of an object on the basis of the manipulation-quality image (e.g., gripping at the point which corresponds to a pixel with the highest pixel value in the manipulation-quality image) may deliver sub-optimal results, for example because, although the object may be picked up easily at the point, further processing may not take place so easily if it is picked up at this point, e.g. because a point to be treated or even a bar code is covered by a gripper, or because the point is sensitive.

Therefore, according to various specific embodiments, a point for picking up an object on the basis of a combination of manipulation-quality values, as provided by a manipulation-quality image and which indicate how well points may be gripped, is combined with values (referred to herein as "manipulation-preference values" or, in the present case, as "pick-up preference values"), which indicate whether points should be gripped.

According to various specific embodiments, to generate a manipulation-preference image with such manipulation-preference values, a further neural net, e.g. as a further machine learning module 115 in the control device 106, is used, which maps input images onto descriptor stereograms.

An example of such a further neural net 115 is a dense object net. A dense object net (DON) maps an image to an any-dimensional (dimension D) descriptor stereogram. The dense object net is a neural net which, using self-supervised learning, is trained to output a descriptor stereogram for an input image of an image. Images of known objects may therefore be mapped to descriptor images which contain descriptors which identify points on the object regardless of the perspective of the image. A respective DON may be provided for each object type.

Such a neural net 115 (DON below, by way of example) enables a manipulation-preference image to be generated for an input image as follows:

(1) For each object type, a (reference) image of an object of the object type is mapped to a descriptor image by the respective DON 115.

(2) The user selects pixels (e.g. by clicking) on the image of the object where the object should be gripped, and the descriptors of the selected pixels (i.e. the descriptor value to which the pixels have been mapped by the DON 115) are recorded. By way of example, the user may also select pixels by clicking on regions, e.g. on the corner points of a polygon or pixels within a corresponding convex hull. This is repeated until all of the regions or points on the surface which are desired by the user are marked (and the associated descriptors have been recorded). Analogously, the user may also select points which should be avoided when picking up an object.

(3) (1) and (2) may be repeated for multiple reference images in order to include all sides of an object.

A quantity of descriptors which correspond to preferred points for picking up an object (or points to be avoided) is therefore known (and recorded). The DON may detect these points of an object in the input image by searching the recorded descriptors in the input image. Accordingly, the procedure continues as follows:

(4) For the input image,
  a. the DON ascertains a descriptor image from the input image.
  b. The descriptor image for the input image is searched for the recorded descriptors and the manipulation-preference image (for example with pixel values in the range [0, 1]) is generated such that the pixel value of a pixel indicates how well the descriptor of the pixel matches one of the recorded descriptors, i.e. illustratively in the form of a "(descriptor-correlation) heat map", with regard to the correlation with the recorded descriptors and therefore the points selected by the user. This may take place, for example, such that, for each recorded descriptor, a respective heat map is generated and the manipulation-preference image is generated as a (pixel-wise) maximum over all of these heat maps.

Figure 2:
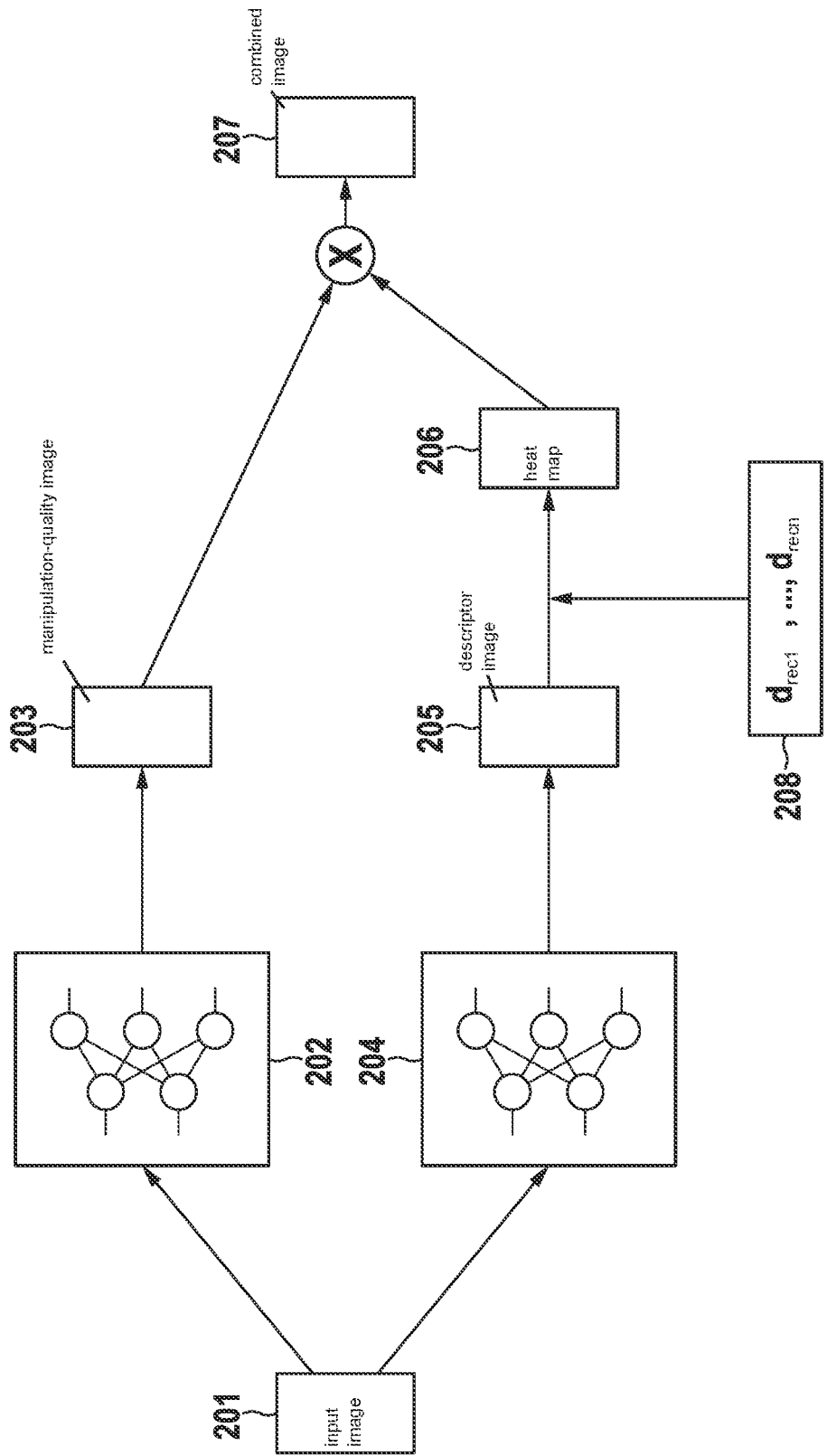
FIG. 2 illustrates the ascertainment of a point for picking up an object according to a specific example embodiment of the present invention.

FIG. 2 illustrates the ascertainment of a point for picking up an object according to a specific embodiment, for example carried out by the control device 106.

An input image 201 is fed to a first neural network 202 (corresponding to the neural network 112), which generates a manipulation-quality image 203 (a pick-up quality image in the present case, in which the manipulation involves picking up an object).

The input image 201 is fed to a second neural network 204 (corresponding to the neural network 115), which generates a descriptor image 205 for the input image 201. Through a comparison with the recorded descriptors 208, a heat map 206, i.e. a manipulation-preference image (in the present case, a manipulation-preference image for which the manipulation involves picking up an object), is generated from the descriptor image.

The manipulation-quality image 203 and the manipulation-preference image 206 are combined, in this case through pixel-wise multiplication of the pixel values of the two images, for example.

The point at which the robot arm 101 grips the object 113 is then selected by the control device 106 on the basis of the combination 207 of the manipulation-quality image and the manipulation-preference image.

By way of example, a combined image 207 may be generated (e.g. through pixel-wise multiplication of the manipulation-quality image and the manipulation-preference image) and further processing may take place to determine a point for picking up an object, or a pick-up pose, e.g., by selecting a global maximum in the combined image.

The ascertainment of pick-up qualities is therefore supplemented by ascertaining pick-up preferences using a neural network, which generates the descriptor image (e.g., a DON). A user may identify preferred regions of objects for a small number of (initial or reference) images manually and the control device 106 detects these regions based on their descriptors for new input images and may therefore prefer them over other regions (provided their pick-up quality is sufficiently high). Since the user only needs to mark a small number of regions or points, the approach described above may also be easily used by unpracticed users.

The neural net 122 which ascertains the pick-up qualities may be trained in a supervised manner from existing input data (e.g., RGB-D images), which are annotated such that they are provided with labels which denote points on the surface of objects at which the objects may be picked up.

Corresponding training data may in turn be generated via a DON by automatically generating the target output of the neural net 103 via the DON. To this end, regions which are suitable for picking up objects are denoted on the surfaces of known (training) objects (which may also take place indirectly by marking regions with poor suitability). By detecting these regions in the training input images, the regions in the training input images may be denoted automatically. The detection of the regions in the training input images may in turn take place using the descriptors.

The training of the DON to generate object and scene representations (in the form of descriptor images) may be self-supervised. By way of example, this uses a method in which a static (i.e., stationary, e.g. fixed) camera may be used to capture the images, i.e. training images are captured, which depict a respective training scene from a single perspective. Training data for the machine learning model are generated by augmenting captured training images of the training scene. This take place in two (or multiple) ways so that, for every captured training image, the training data contain multiple augmented versions of the captured training image. The applied augmentations may then be used to ascertain which pixels correspond to each other. Such augmentations (which enable this and may therefore be used according to various specific embodiments) are, for example, random rotations, perspective and affine transformations. The DON may then be trained through contrast loss using training image pairs, each training image pair comprising a captured training image and an augmentation of the training image or two augmented versions of the training image. Descriptor values which are generated by the DON for mutually corresponding pixels are used as positive pairs, and descriptor values which are generated by the machine learning model for mutually non-corresponding pixels are used as negative pairs.

By way of example, the training of the DON takes place as follows:

(1) A quantity of object types, with which the robot should be able to work (i.e. which it should be able to pick up automatically), is selected
(2) Random objects of the object types are placed in a container in the working area of the robot 100.
(3) An RGB-D-image of the working region is captured
(4) The RGB-D image is augmented and the DON is trained in a self-supervised manner using the augmentations (and, for example, contrast loss).

Figure 3:
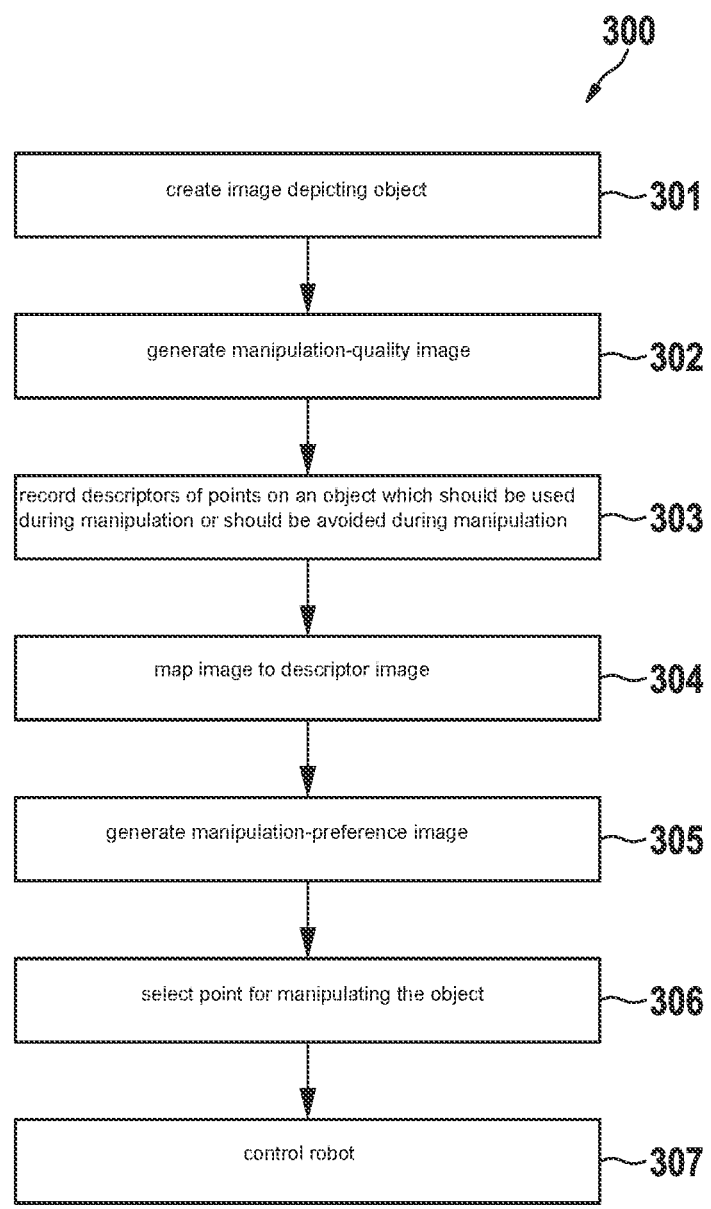
FIG. 3 depicts a flow chart, which illustrates a method for controlling a robot for manipulating, in particular picking up, an object, according to an example embodiment of the present invention.

In summary, according to various specific embodiments, a method is provided as shown in FIG. 3.

FIG. 3 depicts a flow chart 300, which illustrates a method for controlling a robot for manipulating, in particular picking up, an object.

In 301, an image is created which depicts the object.

In 302, a manipulation-quality image is generated from the image, in which, for each pixel which represents a point on the surface of the object, the pixel value of the pixel provides an assessment of how well the object may be manipulated at the point.

In 303, descriptors of points of the object which, according to a user input, should be used during the manipulation, and/or of points which, according to a user input, should be avoided during the manipulation, are recorded.

In 304, the image is mapped to a descriptor image.

In 305, a manipulation-preference image is generated by comparing the recorded descriptors of points to the descriptor image, in which manipulation-preference image, for each pixel which represents a point on the surface of the object, the pixel value of the pixel provides an assessment of whether the object should be manipulated at the point.

In 306, a point for manipulating the object is selected, taking into account the pixel values of the manipulation-quality image and the pixel values of the manipulation-preference image.

In 307, the robot is controlled to manipulate the object at the selected point.

According to various specific embodiments, in other words, annotations according to user preferences are combined with AI-led prediction of points for manipulation using an (e.g. object-centered, self-supervising) trained object-representation model (which generates descriptors, e.g. a DON). The object-representation model enables a human user to indicate points which are predicted to lead to greater success (when picking up an object or during further processing), these points automatically being detected for newly captured input images.

It should be noted that the processing in FIG. 3 does not necessarily have to take place in the order shown. For example, the manipulation-preference image may also be generated before the manipulation-quality image.

The method in FIG. 3 may be carried out by one or more computers with one or more data processing units. The term "data processing unit" may be understood as any type of entity which enables processing of data or signals. By way of example, the data or signals may be handled according to at least one (i.e. one or more than one) specific function which is carried out by the data processing unit. A data processing unit may comprise an analog circuit, a digital circuit, a logic circuit, a microprocessor, a micro-controller, a central processing unit (CPU), a graphics processing unit (GPU), a digital signal processor (DSP), an integrated circuit of a programmable gate array (FPGA) or any combination thereof or it may be formed from these. A data processing unit or logic circuit arrangement may be understood to be another way of implementing the respective functions, which are described more precisely herein. One or more of the method steps described in detail here may be executed (e.g. implemented) by a data processing unit via one or more specific functions which are carried out by the data processing unit.

Color images and depth images may serve as input data for the machine learning models. However, these may also be supplemented by sensor signals of other sensors, e.g. radar, LiDAR, ultrasound, movement, thermal images etc. By way of example, an RGB and depth image is captured in a robot cell and the image (or a plurality of such images) is (or are) used to generate candidate points for gripping one or more objects and to generate a descriptor-correlation heat map on the basis of annotations according to a user preference. The likelihood heat map may be used to reject candidate points with low likelihood values. Candidate points for which the descriptors are close to the recorded descriptor values, i.e. close to the descriptors of the points selected by the user, are accepted, whilst candidate points for which the descriptors are significantly different from the recorded descriptor values are rejected. For example, if the heat map value at a pixel position is under a barrier, a candidate point located at this pixel position is rejected.

The robot may then select a point (at random) from the remaining candidate points and grip the respective object (or apply suction) at the selected point.

Specific embodiments may be used to train a machine learning system and control a robot, e.g., autonomously control robot manipulators, in order to accomplish various manipulation tasks in various scenarios. In particular, specific embodiments may be applied for controlling and supervising the execution of manipulation tasks, e.g. in assembly lines.

Although specific embodiments have been illustrated and described here, an expert in the field will recognize that the specific embodiments depicted and described may be substituted for a variety of alternative and/or equivalent implementations without deviating from the scope of the present invention. This application is intended to cover any adaptations or variations of the specific embodiments which are explained here.

What is claimed is:

1. A method for controlling a robot for manipulating, including picking up, an object, comprising the following steps:
    creating an image which depicts the object;
    generating a manipulation-quality image from the image, in which, for each pixel which represents a point on a surface of the object, the pixel value of the pixel provides an assessment of how well the object may be manipulated at the point;
    recording descriptors: (i) of points of the object which, according to a user input, should be used during the manipulation, and/or (ii) of points which, according to a user input, should be avoided during the manipulation;
    mapping the image onto a descriptor image;
    generating a manipulation-preference image by comparing the recorded descriptors of points to the descriptor image, wherein in the manipulation-preference image, for each pixel which represents a point on a surface of the object, a pixel value of the pixel provides an assessment of whether the object should be manipulated at the point;
    selecting a point for manipulating the object taking into account the pixel values of the manipulation-quality image and the pixel values of the manipulation-preference image; and
    controlling the robot to manipulate the object at the selected point.

2. The method as recited in claim 1, wherein: (i) the manipulation-quality image is mapped by a first neural network, which is trained to map images of objects and/or information derived from images of objects onto manipulation-quality images, and/or (ii) the image is mapped onto the descriptor image by a second neural network, which is trained to map images of objects onto descriptor images.

3. The method as recited in claim 1, further comprising:
    combining the manipulation-quality image and the manipulation-preference image, and selecting the point for manipulating the object using the combination.

4. The method as recited in claim 1, wherein the assessment for whether the object should be manipulated at the point is the degree of correlation between the descriptor which is assigned to the point in the descriptor image and one of the recorded descriptors.

5. The method as recited in claim 1, further comprising:
    generating the manipulation-quality image by forming a descriptor-correlation image for each recorded descriptor, in which, for each pixel which represents a point on the surface of the object, a pixel value of the pixel indicates how well the descriptor which is assigned to the point in the descriptor image correlates with the recorded descriptor, and combining the descriptor-correlation images to form the manipulation-quality image.

6. The method as recited in claim 5, further comprising:
combining the manipulation-quality image and the manipulation-preference image through pixel-wise multiplication, calculating the pixel-wise maximum, calculating the pixel-wise minimum, excluding points for which the manipulation-quality image indicates a manipulation quality below a predetermined minimum quality, excluding points for which the manipulation-preference image indicates a correlation with a descriptor below a minimum correlation for a point which, according to the user input, should be used during the manipulation, and/or excluding points for which the manipulation-preference image indicates a correlation with a descriptor above a predetermined maximum correlation, recorded for a point which, according to the user input, should be avoided during the manipulation.

7. A robot control device configured to control a robot for manipulating, including picking up, an object, the robot control device configured to:
create an image which depicts the object;
generate a manipulation-quality image from the image, in which, for each pixel which represents a point on a surface of the object, the pixel value of the pixel provides an assessment of how well the object may be manipulated at the point;
record descriptors: (i) of points of the object which, according to a user input, should be used during the manipulation, and/or (ii) of points which, according to a user input, should be avoided during the manipulation;
map the image onto a descriptor image;
generate a manipulation-preference image by comparing the recorded descriptors of points to the descriptor image, wherein in the manipulation-preference image, for each pixel which represents a point on a surface of the object, a pixel value of the pixel provides an assessment of whether the object should be manipulated at the point;
select a point for manipulating the object taking into account the pixel values of the manipulation-quality image and the pixel values of the manipulation-preference image; and
control the robot to manipulate the object at the selected point.

8. A non-transitory computer-readable medium on which are stored commands for controlling a robot for manipulating, including picking up, an object, the commands, when executed by a processor, causing the processor to perform the following steps:
creating an image which depicts the object;
generating a manipulation-quality image from the image, in which, for each pixel which represents a point on a surface of the object, the pixel value of the pixel provides an assessment of how well the object may be manipulated at the point;
recording descriptors: (i) of points of the object which, according to a user input, should be used during the manipulation, and/or (ii) of points which, according to a user input, should be avoided during the manipulation;
mapping the image onto a descriptor image;
generating a manipulation-preference image by comparing the recorded descriptors of points to the descriptor image, wherein in the manipulation-preference image, for each pixel which represents a point on a surface of the object, a pixel value of the pixel provides an assessment of whether the object should be manipulated at the point;
selecting a point for manipulating the object taking into account the pixel values of the manipulation-quality image and the pixel values of the manipulation-preference image; and
controlling the robot to manipulate the object at the selected point.

\* \* \* \* \*